March 13, 1956  G. P. GRAVENHORST ET AL  2,737,853
WING MOUNTED DEFENSIVE UNITS FOR AIRPLANES
Filed July 15, 1949  2 Sheets-Sheet 1
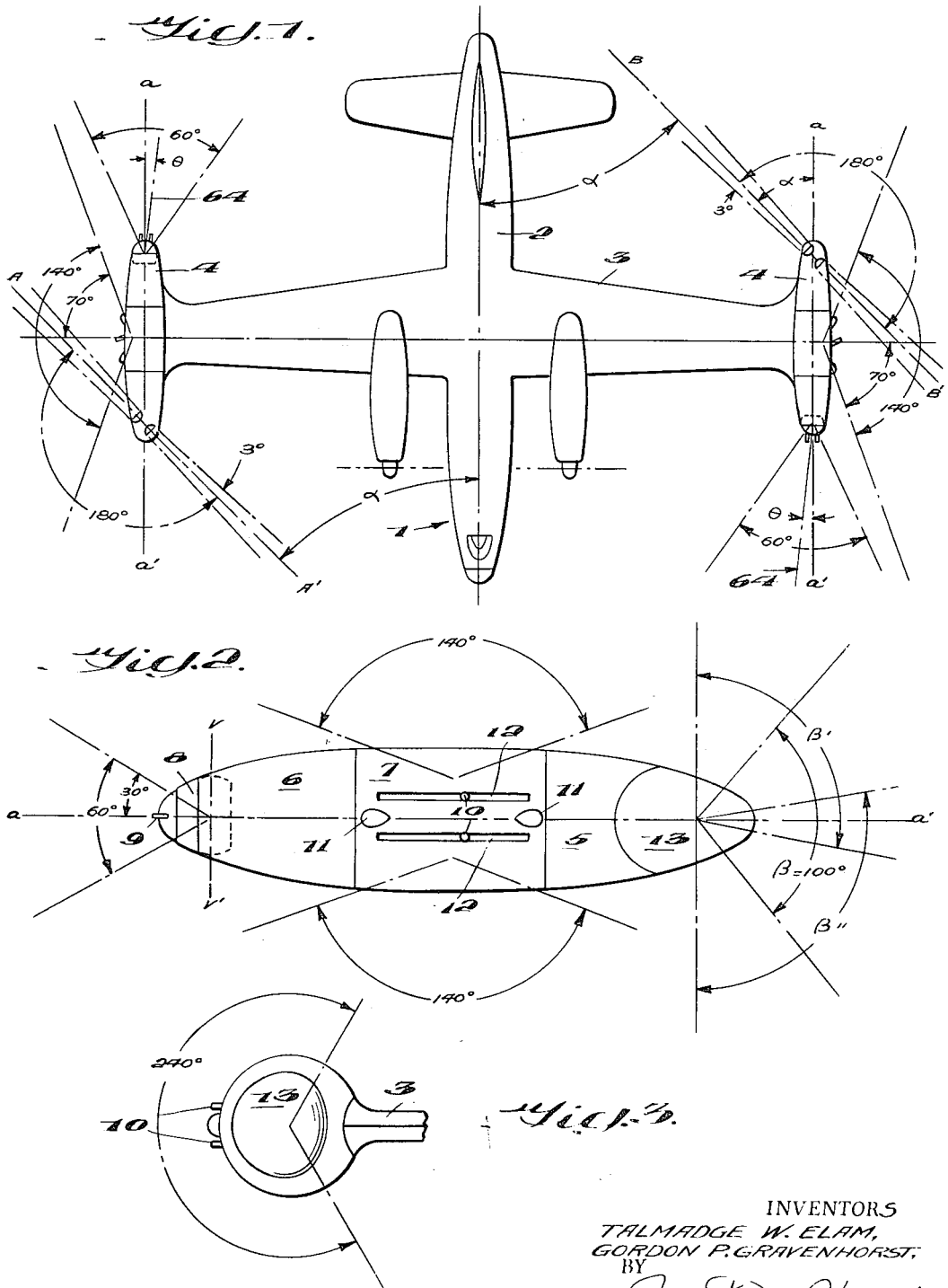
INVENTORS
TALMADGE W. ELAM,
GORDON P. GRAVENHORST,
BY
Martin E. Hogan Jr.
ATTORNEY

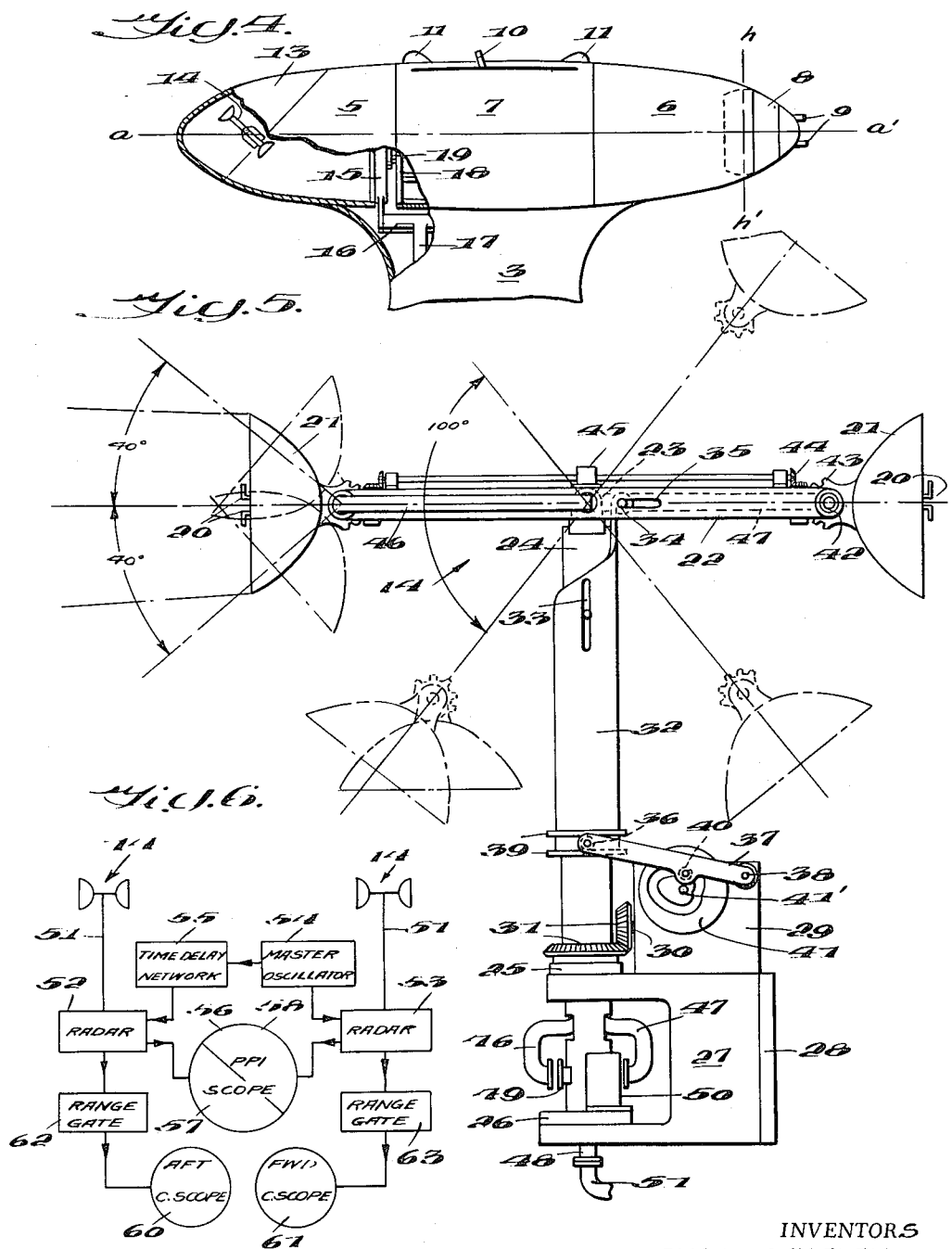

United States Patent Office 2,737,853
Patented Mar. 13, 1956

2,737,853

WING MOUNTED DEFENSIVE UNITS FOR AIRPLANES

Gordon P. Gravenhorst, Middle River, and Talmadge W. Elam, Raspeburg, Md., assignors to The Glenn L. Martin Company, Middle River, Md., a corporation of Maryland Application July 15, 1949, Serial No. 104,914

4 Claims. (Cl. 89—37.5)

This invention relates to improved defensive units for airplanes and particularly to a novel arrangement of such units wherein they are mounted at the tips of the wings of the airplane to provide complete spherical defense coverage.

Modern-day bombing aircraft are capable of covering such great distances and at such relatively high speeds that they are at the present time required to be substantially self-sufficient in that they can no longer rely upon fighter aircraft to protect them from enemy aircraft. It is, therefore, imperative that such bombing aircraft be provided with armament capable of giving full spherical fire coverage as well as that they be provided with suitable search radar equipment for detecting any enemy aircraft in their general vicinity. To be most effective, such radar coverage must also be substantially spherical. Up to the present time, attempts to obtain such coverage have resulted in providing a plurality of gun turrets mounted at various points on the fuselage and protruding therefrom into the slip stream and also in providing radar scanners located in radomes also projecting into the slip stream, with the result that rather great drag has been produced. Moreover, the location of the turrets and radar units on the fuselage has necessitated rather complicated apparatus to prevent interference by the projecting portions of the airplane itself.

It is an object of the present invention to provide an arrangement of gun turrets and radar scanning units which will provide for full spherical coverage with the minimum of drag.

It is a further object to provide a pair of compact streamlined defensive units or housings carried at the extreme tips of the wings of an airplane, each providing for radar searching and gun fire coverage over at least a full hemisphere.

It is a further object to provide such an arrangement wherein said defensive units are oppositely oriented relative to the direction of movement of said aircraft whereby full spherical coverage will be obtained from two such units, one in each wing tip.

It is another object of this invention to provide a mounting for a radar scanner within a streamlined housing at the tip of the wing of an airplane wherein said scanner will be oriented so as to provide effective coverage of a full hemisphere and which will yet permit effective streamlining of said housing.

A further object is to provide an elongated streamlined defensive unit at the tip of the wing of an airplane, comprising a generally conical end portion housing a radar scanner so oriented therein as to provide hemispherical search coverage, a central portion constituted by a barrel-type gun turret rotatable about the axis of said unit, and a second conical end portion including a gun turret mounted in the tip thereof, said turrets together having fire coverage in excess of a hemisphere.

Yet a further object is to provide such a defensive unit in which the two end portions are substantially symmetrical whereby a similar unit may be reversibly arranged on the opposite wing tip to cooperate with the other unit to give full spherical radar and fire coverage about said aircraft without producing undesirable yawing moments on the airplane.

Further objects and advantages will become apparent from a reading of the following description and claims.

In the drawings:

Figure 1 is a somewhat diagrammatic plane view of an airplane equipped with the defensive wing units of the invention.

Figure 2 is a side view of one of the units.

Figure 3 is an end view looking toward the radome end of one of the units.

Figure 4 is a fragmentary plan view of one of the units showing the manner in which it is attached to the wing.

Figure 5 is a side view of the scanning mechanism.

Figure 6 is a block diagram of the radar system employed.

Turning first to Figure 1, there is shown an airplane 1 having the usual fuselage 2 and laterally extending wings 3. Carried at the outer extremity of each wing is an elongated streamlined defensive unit or housing 4 containing the defensive equipment for said airplane. Each unit comprises a pair of relatively stationary, generally conical end portions 5 and 6 and a centrally arranged barrel-type gun turret 7 arranged therebetween, said barrel turret being mounted for rotation about the longitudinal axis $a$—$a'$ of said unit. The end portion 6 includes a gun turret 8 mounted in a well-known manner for limited swinging about a vertical axis $v$—$v'$ and a horizontal axis $h$—$h'$. Guns 9 carried by the turret 8 are rotatable with said turret about said axes so as to have approximately 60° conical fire coverage as clearly indicated in Figures 1 and 2. Barrel turret 7 carries a pair of guns 10 angularly traversible in a plane extending generally longitudinally of the barrel turret through an angle of approximately 140° as shown in Figures 1 and 2 and rotatable with the turret about the axis $a$—$a'$ through an angle of substantially 240° as indicated in Figure 3. The guns 10 extend through suitable slots 12 in the outer covering of the barrel turret. A pair of radomes 11, for use with suitable radar-type gun directing apparatus (not shown), is located on the exterior of the barrel turret as shown in Figures 2 and 4. End portion 5 includes a radome 13 forming the extreme end of said tip portion. Mounted within the housing 5 in position to scan through the radome 13 is a search radar scanning mechanism generally designated at 14 and to be described in more detail herebelow.

As best shown in Figure 4, the wing packages or units include stationary disc-like supporting members 15 rigidly carried by a hollow tubular member 16 extending across the end of the wing and rigidly attached to the wing spars 17. The framework 18 of the barrel turret is rotatably carried by bearing members 19 formed on discs 15, while housing portions 5 and 6 are rigidly carried by said discs 15. The skin of the wing is faired smoothly into close proximity with the units, as shown in the drawings.

While any desired system of search radar scanning could be employed, the so-called helical system is well adapted to give both the substantially spherical coverage desired and to furnish information to the operator in a form which may be quickly and easily interpreted, to enable him to best plan what defensive action should be taken. In the helical scanning system, a scanning beam is caused to be successively swept rapidly through a desired angle about a vertical axis while at the same time, it is caused to be slowly tilted or nodded about a horizontal axis so as to cover the desired sector in a succession of slightly overlapping paths, one above the other. Since, it would be substantially impossible to obtain full spherical coverage by a single scanner (since the airplane structure itself would interfere), two separate scanning mechanisms are employed, each scanning slightly in excess of a full hemisphere, the two being arranged so that together they provide the desired full spherical coverage.

Each radar scanning mechanism, as shown in Figure 5, includes a pair of opposed highly directional antenna units comprising antenna elements 20 associated with generally parabolic reflectors 21. The antenna units are so designed that a scanning beam approximately six degrees in width is produced thereby. The antenna units are carried at opposite ends of a pair of arms 22, said arms being pivotally supported at their center portions for oscillation in a vertical plane about the axis of suitable bearings 23 carried at the upper end of a tubular post 24. This post 24 is supported for rotation about its vertical axis by bearings 25 and 26 carried by a support 27. Support 27 has a flange 28 by which it may be attached to suitable structure inside of the housing portion 5 to fixedly mount the scanning mechanism therein. The scanner is rotated about said vertical axis by means of a suitable motor (not shown) mounted within housing 29 and driving a shaft 30 arranged to rotate the post 24 by means of bevel gearing 31.

To oscillate or nod the arms 22 and the antenna units carried thereby about the axis of bearings 23, a sleeve 32 is slidably mounted on post 24 and is caused to rotate therewith by a suitable pin and slot connection 33. Sleeve 32, at one side thereof, is extended upwardly between the arms 22 and carries at its upper end a transverse pin 34 which extends outwardly through slots 35 formed in the arms 22. Thus, it can be seen that by reciprocating sleeve 32 relative to post 24, the arms 22 will be swung up and down about their mean position shown in Figure 5 in solid lines. Any suitable mechanism may be employed for so reciprocating sleeve 32. For example, a roller 36, carried at the outer end of a lever 37 pivotally supported at 38 from the housing 29, may be provided to engage between flanges 39 formed on the lower end of said sleeve. A second roller 40, carried by an intermediate portion of lever 37, is adapted to ride in a cam slot of a cam 41 carried by a shaft 41' at the side of housing 29.

Shaft 41' is adapted to be rotated by suitable reduction gearing (not shown) located within the housing 29 and driven by the same motor that rotates posts 24. Shaft 41 rotates at a much slower rate than post 24 so that the scanners will make several sweeps across the sector to be scanned during each nodding cycle. The ratio will be such that the desired amount of overlap between successive sweeps will obtain.

With the arrangement so far described, the scanning coverage would not include a full 180° in a vertical plane since arms 22 may be oscillated through only about 100°. In order to get full hemispherical coverage, the antenna units are pivotally mounted as shown at 42 on the outer ends of arms 22. The reflectors include gear sectors 43 adapted to be driven by suitable gearing 44 from a small electric motor 45 carried centrally by the arms 22. Actuation of the motor 45 in one direction will cause both reflectors to be swung upwardly simultaneously about their pivots 42 while rotation in the opposite direction will cause the reflectors to swing downwardly about said pivots. Motor 45 is adapted to be energized at the discretion of the operator and will be connected by suitable electric leads and slip rings (not shown), to suitable control means located at the operator's station in the fuselage.

Energy is fed to and from the antennas 20 by suitable wave guides 46 and 47, one leading to each of the antenna units. As indicated in Figure 5, these wave guides will include the usual swivel connections coaxial with pivots 42 and 23. These wave guides lead downwardly through the hollow interior of post 24 and outwardly through suitable openings in the side thereof between bearings 25 and 26. The lower ends of these wave guides are turned inwardly as shown in Figure 5 to couple with a suitable radio frequency switch. This switch is shown as comprising a T section of wave guide 48 also arranged to rotate with said post and having the ends 49 of its cross portion lying closely adjacent and directly opposite the corresponding open ends of wave guides 46 and 47 in energy coupling relation therewith. Rigidly carried by the bearing 26 is a stationary semi-cylindrical shield 50 arranged to extend into the space between the ends of the T section and the corresponding ends of wave guides 46 and 47 to alternately prevent coupling therebetween during successive 180° of rotation as the scanning mechanism rotates about the axis of post 24. The shield 50 is so positioned that, at any particular time, the wave guide 46 or 47 associated with the antenna unit sweeping through the 180° lying opposite from the mounting support 27 at that particular time, will be coupled with the T section 48 while the wave guide associated with the other antenna unit will be effectively blocked by the shield. Energy is fed to T section 48 by means of stationary wave guide section 51 having a suitable swivel connection therewith coaxial with the axis of rotation of post 24.

The parts are proportioned so that for any particular adjustment of the antenna units relative to arms 22 the scanner will automatically scan a sector of space extending approximately 180° in azimuth about the axis of post 24 and extending approximately 100° in elevation about the axis of bearings 23. With the antenna units adjusted as shown in solid lines in Figure 5 relative to arms 22, the sector will extend substantially 50° above and 50° below a horizontal plane through the axis of bearings 23. Actually, since the scanning beam itself has a width of approximately 6°, the angular extent of the sector scanned will be slightly greater than the above, as clearly indicated in Figure 1.

By energizing motor 45 to cause rotation thereof in the desired direction, the antenna units may be adjusted relative to bars 22 through a vertical angle of 40° in either direction from their position shown in full lines in Figure 5, to shift the sector to be automatically scanned relative to the airplane. Thus by tilting both antenna units downwardly 40° relative to the arms 22, the sector of space scanned will extend from directly below the airplane to about 10° above a horizontal plane through the scanner as indicated at β" in Figure 2. Conversely by tilting the antenna units upwardly relative to the arms 22, the sector scanned will extend from about 10° below the horizontal to a point directly above the airplane as indicated at β' in Figure 2.

Thus with the arrangement shown, it can readily be seen that each scanning mechanism 14 is adapted to substantially completely scan the hemispherical sector of space lying to one side of a vertical reference plane passing through the axis of post 24. As indicated in Figure 1, the scanners are so oriented in their housing portions 5 as to be able to scan the hemispherical sectors lying outwardly from the airplane beyond their reference planes A—A' and B—B', which reference planes lie substantially parallel and at an angle α relative to the intersect said axis beyond but relatively adjacent the longitudinal axis of the airplane fuselage such that they corresponding ends of the fuselage. While these reference planes are spaced slightly relative to one another, it should be remembered that the actual sectors scanned will extend slightly inwardly beyond their corresponding planes due to the angular divergence of the scanning beam itself as shown in Figure 1. The sectors scanned by the two oppositely disposed scanning units will therefore converge and intersect at some predetermined distance outwardly from the airplane. Beyond that distance, full spherical scanning coverage will, therefore, be provided by the two units.

As is diagrammatically indicated in Figure 6, the two search radar units 52, 53 are adapted to be controlled by a single master oscillator 54 with a time delay network 55 interposed between the oscillator and one of the radar units to minimize danger of mutual interference.

The information received in the form of pulses reflected from any objects lying within the sectors searched by the associated scanners is applied to a conventional P. P. I. scope 56, controlled in the usual manner in accordance with the pulse rate of the radar apparatus and the sweep of the scanners, so as to cause bright spots to appear on the face thereof in positions corresponding to the azimuth and the distance of the objects relative to the airplane. Since each radar scanning unit covers only about 180° in azimuth, a single P. P. I. scope can be employed, with each unit producing its indications in the corresponding semi-circular sector 57, 58 of the face of the scope.

The reflected pulses detected by each scanner are also applied to another scope 60 or 61, termed a C-scope, one C-scope being provided for each of the radar units. These C-scopes 60, 61 are controlled, also in a well-known manner, in accordance with the sweep and the nod of the associated scanners, so that a bright spot will appear on the surface thereof at a point displaced horizontally from a reference line to an extent corresponding to the azimuth of the object relative to the airplane, and displaced vertically from a second reference line to an extent corresponding to the angular elevation of the object relative to the airplane.

If desired, a suitable manually variable range gate 62 or 63 may be provided between each radar apparatus and its associated C-scope so as to pass only those reflected pulses corresponding to objects lying generally at a preselected distance from the airplane, to the C-scope. Such a range gate is arranged to be conductive only during a certain portion of the radar pulsing cycle, thus allowing only those reflected pulses received during this portion of the cycle to pass therethrough. The purpose of such a range gate is to minimize the amount of random "noise" that will be applied to the C-scope and which might otherwise tend to mask a pulse reflected from an actual target.

The orientation of the scanners so that the sector scanned by each extends across the axis of the fuselage as above described is an important factor in fulfilling the desired objectives. It is most vital that the radar scanning be particularly effective in the areas directly ahead of and directly behind the airplane, particularly the former, since the minimum time in which to prepare for defense occurs when substantially "head-on" interception is attempted by enemy aircraft. Since the sensitivity of both the scanning mechanism and of the indicating scopes associated therewith is quite apt to drop off radically adjacent the fringes of the sectors covered thereby, it is desirable that these fringe areas be angularly displaced as far as possible from the axis of flight to insure that enemy aircraft in the vital area generally ahead of the airplane will be quickly and certainly detected. By orienting the scanners as described, so that the sectors scanned pass close to, but without hitting, the corresponding ends of the fuselage, the insensitive fringe areas are placed well away from the vital fore and aft areas. Moreover, by so orienting the scanners, it is possible to scan a full hemisphere through the generally conical end portion of the unit without requiring that the associated radome project outwardly from the wall of the unit to interfere with the desired smooth streamlining of the unit.

Also, by forming the central portion of each unit as a barrel-type gun turret, providing for fire coverage over a relatively large sector about the airplane, it is possible to make the end portions of the unit substantially symmetrical and of a contour offering extremely low drag, since but a relatively small conical sector of fire coverage is required to be furnished by the turret in the tip of the one end portion, permitting a relatively small, well-streamlined construction. Thus it is possible to orient the units oppositely on the wing tips so as to provide full spherical fire and radar coverage and yet the drag of the two units will be substantially equal. Obviously any appreciable difference in drag produced by units mounted at the tips of the wings as are those of this invention, could not be tolerated, as it would result in an objectionable yawing moment on the airplane. With the arrangement disclosed, not only is the actual value of drag kept relatively low, but it is substantially equal at both wing tips, thus minimizing any such adverse yawing tendency.

It should be noted that while definite angular relationships have been included in the drawing and description, these are merely for purposes of illustration, not of limitation, and obviously considerable variation from the exact angles indicated is possible without departing from the principle of operation of the invention.

Where, in the description and claims, such terms as vertical or horizontal have been used, they are intended to refer to the conditions when the airplane is in normal, horizontal flight position.

While but one embodiment of the present invention has been specifically described, it is obvious that many changes and substitutions can be made without departing from the spirit and scope of the invention as set forth in the appended claims.

We claim as our invention:

1. In combination with an airplane having a fuselage and wings extending laterally therefrom, a defensive unit carried at the tip of each wing thereof and each comprising an elongated streamlined housing extending generally parallel to the longitudinal axis of said airplane, each of said units including a generally conical end portion including a radome forming one end of said housing, a second generally conical end portion including a gun turret mounted in the tip thereof for restricted swinging about perpendicularly related axes and forming the other end of said housing and a barrel-type turret mounted between said end portions for angular movement about the longitudinal axis of said unit and forming the central portion of said housing, search radar apparatus including a scanner housed in said first-mentioned end portion of each of said units and adapted to substantially completely scan, through said radome, the hemispherical sector of space extending outwardly from said airplane and lying to one side of a vertical reference plane passing through said scanner and intersecting the longitudinal axis of said fuselage beyond the corresponding end thereof, the units being reversely arranged on said wing tips so that the tip turret of one of said units is directed generally forwardly while that of the other unit is directed generally rearwardly of said airplane, and so that said scanners are so oriented that their reference planes lie substantially parallel whereby generally opposite and complementary hemispherical sectors will be scanned thereby.

2. In combination with an airplane having a fuselage and wings extending laterally therefrom, an elongated streamlined unit carried at the outer end of each wing, said units including gun turrets adapted to provide full spherical gun fire coverage about said airplane, the forward end of one of said units, and the rearward end of the other of said units being formed as radomes, a radar scanner mounted in the corresponding end of each unit in position to scan, through said radome, a substantially complete hemispherical sector of space about said airplane, said scanners being so oriented in said units that relatively opposite sectors will be scanned thereby and whereby said sectors will extend across the longitudinal axis of said fuselage beyond but adjacent the corresponding ends thereof so that the airplane will lie entirely between the sectors scanned.

3. In combination with an airplane having a fuselage and wings extending laterally therefrom, an elongated streamlined unit carried at the tip of one of said wings, with its longitudinal axis substantially parallel to the longitudinal axis of said fuselage, said unit comprising generally symmetrical conical end portions and a central portion carried therebetween and constituting a barrel-type gun turret rotatable about the longitudinal axis of said unit, one of said conical end portions including a second gun turret in the tip thereof adapted to provide, with said barrel-type turret, at least hemispherical fire coverage about said airplane, the opposite conical end portion including a radome and a radar scanner completely housed therein in position to scan, through said radome, a generally hemispherical sector of space about said airplane, said scanner being so oriented that the sector scanned thereby will extend across the longitudinal axis of said fuselage beyond but adjacent the corresponding end thereof, with the airplane lying entirely outside of the sector scanned.

4. In combination with an airplane having a fuselage and wings extending laterally therefrom, an elongated streamlined unit carried at the tip of each wing of said airplane, said units having their longitudinal axes substantially parallel to the longitudinal axis of said fuselage, each of said units comprising generally symmetrical conical end portions and a central portion carried therebetween and constituting a barrel-type gun turret rotatable about the longitudinal axis of said unit, one of said conical end portions including a second gun turret in the tip thereof adapted to provide with said barrel-type turret at least hemispherical fire coverage about said airplane, the opposite conical end portion including a radome and a radar scanner completely housed therein in position to scan, through said radome, a generally hemispherical sector of space about said airplane, said scanner being so oriented that the sector scanned thereby will extend across the longitudinal axis of said fuselage beyond but adjacent the corresponding end thereof, with the airplane lying entirely outside of the sector scanned, the units on opposite wings being relatively reversely arranged, whereby to provide full spherical fire and radar coverage about said airplane.

References Cited in the file of this patent

UNITED STATES PATENTS

| | | |
|---|---|---|
| 2,377,073 | Eaton | May 29, 1945 |
| 2,407,451 | Reiniger | Sept. 10, 1946 |
| 2,454,806 | Kemmer et al. | Nov. 30, 1948 |
| 2,463,233 | Alexanderson | Mar. 1, 1949 |
| 2,472,136 | Whitlock | June 7, 1949 |
| 2,520,166 | Page | Aug. 29, 1950 |
| 2,524,702 | Hansell | Oct. 3, 1950 |
| 2,570,251 | Lester | Oct. 9, 1951 |
| 2,572,127 | Field et al. | Oct. 23, 1951 |
| 2,573,021 | Higinbotham | Oct. 30, 1951 |
| 2,654,083 | Lange | Sept. 29, 1953 |

OTHER REFERENCES

"Aero Digest" magazine, issue of December 1, 1945, pages 50–51.